(12) United States Patent
Chu (10) Patent No.: US 10,009,734 B2
(45) Date of Patent: Jun. 26, 2018

(54) INDOOR LOCATION MEASUREMENT SYSTEM AND METHOD USING RADIO SIGNAL TRANSMITTERS

(71) Applicant: Winitech Co., Ltd, Daegu (KR)

(72) Inventor: Kyo Koan Chu, Daegu (KR)

(73) Assignee: WINITECH CO., LTD, Daegu (KR)

( * ) Notice: Subject to any disclaimer, the term of this patent is extended or adjusted under 35 U.S.C. 154(b) by 100 days.

(21) Appl. No.: 15/019,919

(22) Filed: Feb. 9, 2016

(65) Prior Publication Data

US 2016/0234653 A1 Aug. 11, 2016

Related U.S. Application Data

(60) Provisional application No. 62/114,010, filed on Feb. 9, 2015.

(51) Int. Cl.
*H04W 4/02* (2018.01)
*H04W 64/00* (2009.01)
*H04W 4/04* (2009.01)

(52) U.S. Cl.
CPC ............ *H04W 4/043* (2013.01); *H04W 4/023* (2013.01); *H04W 64/00* (2013.01)

(58) Field of Classification Search
CPC ..... H04W 64/00; H04W 4/023; H04W 4/043; H04W 4/04
See application file for complete search history.

(56) References Cited

U.S. PATENT DOCUMENTS

| 9,344,854 B2* | 5/2016 | Hong ....................... H04W 4/04 |
| 2008/0270043 A1* | 10/2008 | Jesmonth .............. A01M 1/026 |
| | | 702/34 |
| 2016/0192157 A1* | 6/2016 | Wirola .................. G01S 5/0252 |
| | | 455/456.1 |
| 2016/0239585 A1* | 8/2016 | Leppanen ............. G01S 5/0263 |

FOREIGN PATENT DOCUMENTS

| KR | 10-2009-0085333 A | 8/2009 |
| KR | 10-0942352 B1 | 2/2010 |
| KR | 10-2012-0051812 A | 5/2012 |
| KR | 10-2014-0028368 A | 3/2014 |

* cited by examiner

*Primary Examiner* — Charles Appiah
*Assistant Examiner* — Margaret G Mastrodonato
(74) *Attorney, Agent, or Firm* — Knobbe Martens Olson & Bear LLP (57) ABSTRACT

An indoor location measurement system and method using RF signal transmitters. A DB stores spatial information of a predetermined space and location information of a plurality of RF signal transmitters installed in the space. A communication unit receives measurement information from a user terminal that has received signal including identification information of an RF signal transmitter output from the wireless signal transmitter. The measurement information includes the identification information and signal strength information of the wireless signal. A controller corrects the signal strength information when an object is determined to be present between the user terminal and of the plurality of wireless signal transmitters in the space based on the spatial information, the location information, and the signal strength information, and measures a current location of the user terminal based on the corrected signal strength information.

3 Claims, 6 Drawing Sheets

INDOOR LOCATION MEASUREMENT SYSTEM AND METHOD USING RADIO SIGNAL TRANSMITTERS

BACKGROUND

Technical Field

The present disclosure relates to an indoor location measurement system and method using radio signal transmitters. More particularly, the present invention relates to a system and a method able to more accurately measure an indoor location by correcting an error of signal strength of a wireless signal that is received by a user terminal through various objects (for example, a wall, a window, or the like) in an indoor space using spatial information of a space and location information of an wireless signal transmitter upon indoor location measurement using a predetermined wireless signal transmitter (for example, a beacon or the like).

Description of Related Technology

A location based service (LBS) that provides an information service based on a location of a user by measuring a location of a user terminal such as a mobile phone is widely used. In general, an LBS measures a location of a user terminal using a global positioning system (GPS) receiver. In the case of the GPS, there are many cases where it is difficult to receive a GPS satellite signal in an indoor space. Thus, it is difficult to provide continuous indoor location information to a user.

In order to solve these problems, various indoor location measurement technologies have been developed. For example, a plurality of access points (APs) are installed in indoor spaces such as the inside of buildings and a location of a user terminal is measured through RF signals. Alternatively, a location of a user terminal is measured using infrared (IR) radiation or ultrasonic waves, as well as RF signals.

SUMMARY

However, these conventional indoor location measurement technologies have drawbacks in that it is impractical for use in indoor spaces because a measurement error is over several meters or a system construction cost is relatively high.

On the other hand, in recent years, much attention has been paid to various services using a beacon that is an wireless signal transmitter able to output a certain wireless signal at a specific frequency. The beacon may output a low-frequency RF signal using a protocol based on Bluetooth 4.0 (BLE: Bluetooth Low Energy). The beacon may support low power consumption and high speed wireless communication. In addition, each Bluetooth chipset may have unique identification information (for example, Universally Unique IDentifier (UUID), major value, minor value, or media access control (MAC) address, or the like) able to identify each device. The beacon has a feature that can identify devices using the unique identification information, without separately performing inter-device pairing and has an advantage that can exchange information with a user terminal in real time. Hence, applications of the beacon are rapidly expanding.

However, in the past, services using the beacon for commercial purposes have been mostly provided. As an example of the use for the commercial purposes, content (for example, advertisement, coupons, or the like) corresponding to identification information of a specific wireless signal transmitter (beacon) is provided to a user terminal receiving an RF signal from the specific wireless signal transmitter (beacon).

On the other hand, there is a need for an improved concept able to more efficiently measure an accurate location of a user terminal using an wireless signal transmitter (beacon) installed in an indoor space such as a building.

In addition, there is a need for an improved concept able to measure a more accurate indoor location by correcting an error (that is, a change (attenuation) of signal strength or intensity) occurring when an wireless signal received by a user terminal (that is, an wireless signal output from an wireless signal transmitter) passes through various objects (for example, a wall, a door, or the like) located indoors using spatial information (in particular, locations/characteristics of the objects) of the space where the wireless signal transmitter is installed and information of the location where the wireless signal transmitter is installed.

Furthermore, there is a need for an inventive concept capable of providing location information to a user even in the event of power failure or other emergency situations by sharing power supplies of an wireless signal transmitter and emergency light or evacuation guidance light using a power supply that is not shut off even in power failure or the like, separately from a regular power supply of a building or the like.

One aspect of the invention provides a method of providing wireless signal intensity data. The method comprises: providing location of a first wireless transmitter installed or to be installed inside a building comprising a plurality of interior structures and objects; providing permeability data indicative of permeability of wireless signals in a radial direction from a point of the first wireless transmitter at a three-dimensional location within the building, wherein the permeability at three-dimensional location is dependent on spatial occupancy and material of a structure or object at the three-dimensional location; processing the permeability data to generate first signal intensity data representing a spatial map of intensity of wireless signals transmitted from the first wireless transmitter, in which equiintensity lines for the first wireless transmitter are not concentric and comprise at least one discontinuous point due to spatial occupancy of at least part of the plurality of interior structures and objects; providing location of a second wireless transmitter installed or to be installed inside a building comprising a plurality of interior structures and objects; providing data indicative of permeability of wireless signals in a radial direction from a point of the second wireless transmitter at a three-dimensional location within the building, wherein the permeability at three-dimensional location is dependent on spatial occupancy and material of a structure or object at the three-dimensional location; processing the permeability data to generate second signal intensity data representing a spatial map of intensity of wireless signals transmitted from the first wireless transmitter, in which equiintensity lines for the second wireless transmitter are not concentric and comprise at least one discontinuous point due to spatial occupancy of at least part of the plurality of interior structures and objects; providing location of a third wireless transmitter installed or to be installed inside a building comprising a plurality of interior structures and objects; providing data indicative of permeability of wireless signals in a radial direction from a point of the third wireless transmitter at a three-dimensional location within the building, wherein the permeability at three-dimensional location is dependent on spatial occupancy and material of a structure or object at the three-dimensional location; and processing the permeability data to generate third signal intensity data representing a spatial map of intensity of wireless signals transmitted from the first wireless transmitter, in which equiintensity lines for the third wireless transmitter are not concentric and comprise at least one discontinuous point due to spatial occupancy of at least part of the plurality of interior structures and objects.

In the foregoing method, the term "equiintensity line" for a wireless transmitter represents a line formed by points on a plane passing the wireless transmitter that have the same intensity of wireless signals from the wireless transmitter and includes at least one discontinuous point due to spatial occupancy of one or more interior structures and objects inside a building. Given the three-dimensional nature of wireless signal transmission, multiple equiintensity lines can be drawn on different planes for the same signal intensity.

In the foregoing method, the spatial occupancy may be represented location, shape, size of an interior structure or object. Providing permeability data may comprise empirical testing of wireless signal intensity at three-dimensional locations inside the building and may further comprise mathematical modeling of wireless signal intensity using spatial occupancy and materials of at least part of the plurality of interior structures and objects. The mathematical modeling may further use data collected from the empirical testing.

Another aspect of the invention provides a method of indoor location information services. The method comprises: performing the foregoing method to provide the first, second and third signal intensity data, in which equiintensity lines comprise a plurality of discontinuous points due to spatial occupancy of at least part of the plurality of interior structures and objects; receiving, from a mobile terminal, a location information request comprising identification of the first wireless transmitter and a first intensity of signals from the first wireless transmitter at a location, identification of the second wireless transmitter and a second intensity of signals from the second wireless transmitter at the location, and identification of the third wireless transmitter and a third intensity of signals from the third wireless transmitter at the location; determining coordinates of the location using the first, second and third intensity and the first, second and third signal intensity data; and sending the coordinates of the location to the mobile terminal.

Another aspect of the invention provides a system for indoor location information services. The system comprises: data store comprising first signal intensity data representing a spatial map inside a building of intensity of wireless signals transmitted from a first wireless transmitter, second signal intensity data representing a spatial map inside the building of intensity of wireless signals transmitted from a second wireless transmitter, and third signal intensity data representing a spatial map inside the building of intensity of wireless signals transmitted from a third wireless transmitter; at least one computing device configured: to receive, from a mobile terminal, a location information request comprising identification of the first wireless transmitter and a first intensity of signals from the first wireless transmitter at a location, identification of the second wireless transmitter and a second intensity of signals from the second wireless transmitter at the location, and identification of the third wireless transmitter and a third intensity of signals from the third wireless transmitter at the location, to determine coordinates of the location using the first, second and third intensity and the first, second and third signal intensity data; and to send the coordinates of the location to the mobile terminal.

A further aspect of the invention provides a method of indoor location information services. The method comprises: providing the foregoing system; receiving, from a mobile terminal, a location information request comprising identification of the first wireless transmitter and a first intensity of signals from the first wireless transmitter at a location, identification of the second wireless transmitter and a second intensity of signals from the second wireless transmitter at the location, and identification of the third wireless transmitter and a third intensity of signals from the third wireless transmitter at the location; determining coordinates of the location using the first, second and third intensity and the first, second and third signal intensity data; and sending the coordinates of the location to the mobile terminal.

Various aspects of the present invention provide a system and method for more efficiently measuring an accurate location of a user terminal using wireless signal transmitters such as a beacon installed in an indoor space such as a building.

Also provided are a system and method for measuring a more accurate indoor location by correcting an error occurring when an wireless signal received by a user terminal (that is, an wireless signal output from an wireless signal transmitter) passes through various objects (for example, a wall, a door, or the like) located indoors.

Also provided are a system and method for providing location information to a user even in the event of power failure or other emergency situations by sharing power supplies of an wireless signal transmitter and emergency light or evacuation guidance light using a power supply that is not shut off even in power failure or the like, separately from a regular power supply of a building or the like.

According to an aspect of the present invention, it is possible to more efficiently measure an accurate location of a user terminal using an wireless signal transmitter such as a beacon installed in an indoor space such as a building and it is possible to measure a more accurate indoor location by correcting an error occurring when an wireless signal received by a user terminal (that is, an wireless signal output from an wireless signal transmitter) passes through various objects (for example, a wall, a door, or the like) located indoors using spatial information of a space where the wireless signal transmitter is installed and location information of the wireless signal transmitter.

In addition, it is possible to provide location information to a user even in the event of power failure or other emergency situations by sharing power supplies of an RF signal transmitter and emergency light or evacuation guidance light using a power supply that is not shut off even in power failure or the like, separately from a regular power supply of a building or the like. Thus, it is possible to guide an evacuation route indoors and it is possible to easily find out a location of a person who is in urgent need of rescue.

BRIEF DESCRIPTION OF THE DRAWINGS

A brief description is given for the enhancement of understanding of the accompanying drawings, in which.

DETAILED DESCRIPTION

Figure 1:
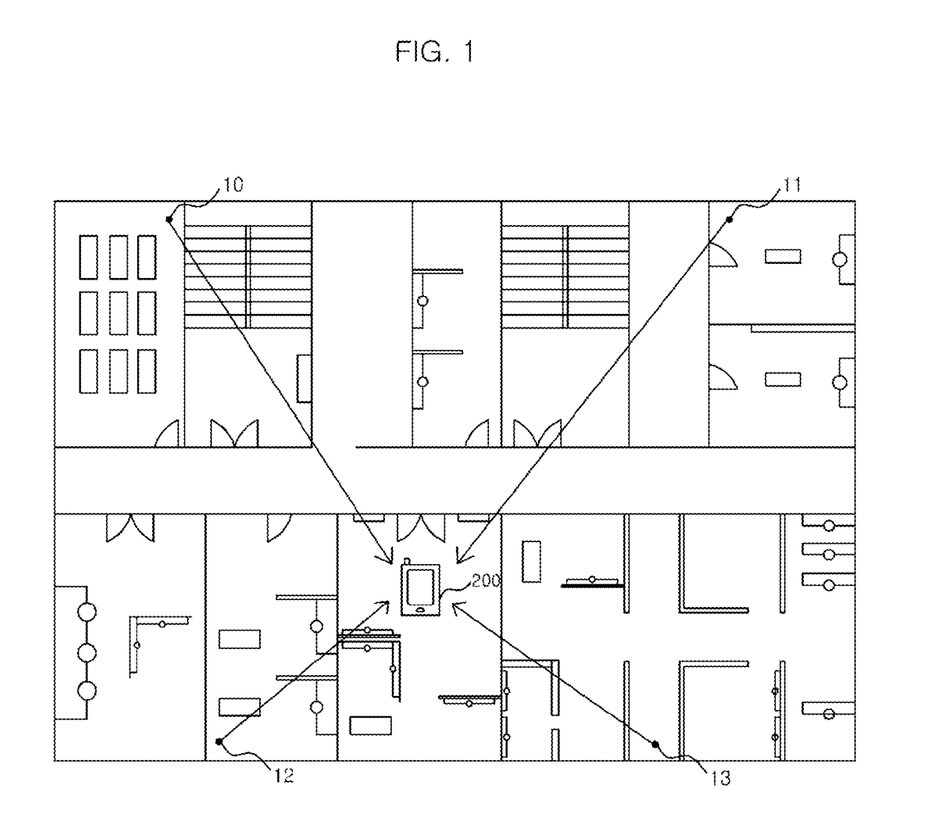
FIG. 1 illustrates an example in which an indoor location measurement system using an wireless signal transmitter according to an embodiment of the present invention measures a location of a user terminal positioned in an indoor space.
Figure 2:
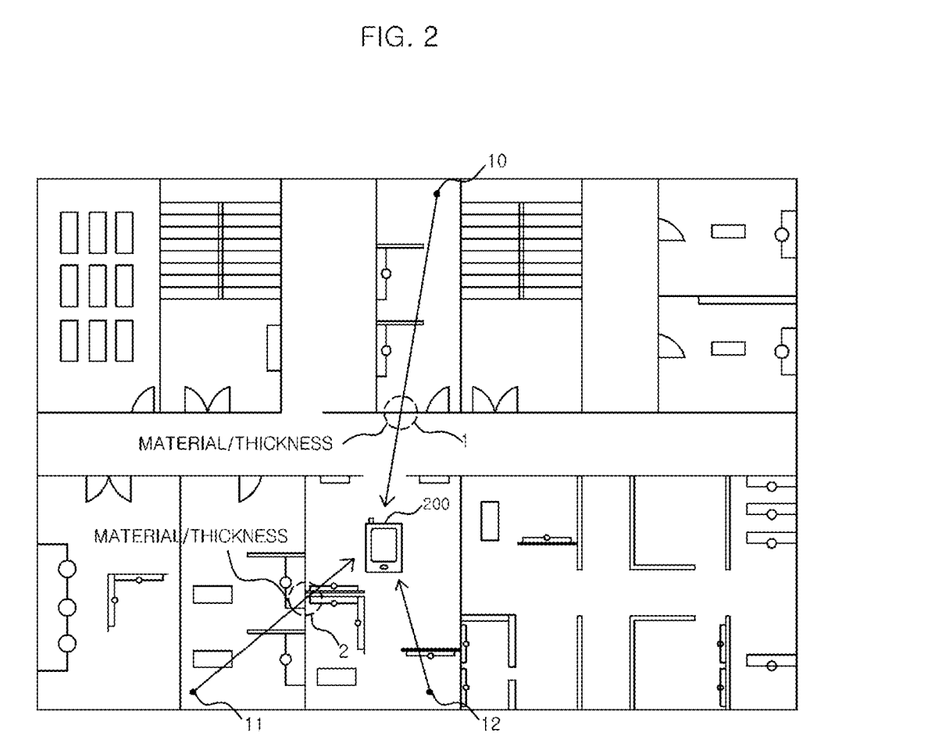
FIG. 2 illustrates an example in which an wireless signal passes through an object positioned in a space in the indoor location measurement system using the wireless signal transmitter according to the embodiment of the present invention.

FIG. 1 illustrates an example in which an indoor location measurement system using an wireless signal transmitter according to an embodiment of the present invention measures a location of a user terminal positioned in an indoor space, and FIG. 2 illustrates an example in which an wireless signal passes through an object positioned in a space in the indoor location measurement system using the RF signal transmitter according to the embodiment of the present invention.

First, referring to FIG. 1, a plurality of wireless signal transmitters, e.g. 10, 11, 12, and 13, may be installed in a predetermined indoor space. A user holding a user terminal 200 may be positioned at a predetermined location within the space.

Each of the plurality of wireless signal transmitters 10, 11, 12, and 13 may be implemented as the above-described beacon, but is not limited thereto. Any device may be used herein as long as the device can be configured to output an wireless signal including its own identification information.

The user terminal 200 may receive an wireless signal output from at least one of the plurality of wireless signal transmitters 10, 11, 12, and 13. It is obvious that the user terminal 200 may receive wireless signals output from all of the plurality of wireless signal transmitters 10, 11, 12, and 13. As such, in a case where the user terminal 200 receives all wireless signals output from the plurality of wireless signal transmitters 10, 11, 12, and 13, all of the plurality of wireless signals may be used for measuring the location of the user terminal 200 according to an embodiment of the present invention, which will be described below. However, some of the plurality of wireless signals received by the user terminal 200 may be used for determining the location of the user terminal 200.

Meanwhile, as described above, identification information of the corresponding wireless signal transmitters may be included in the respective wireless signals. As described above, when the user terminal 200 receives the wireless signal, the user terminal 200 may detect the identification information of the corresponding wireless signal transmitter and the signal strength information of the corresponding wireless signal from the wireless signal, and may transmit the detected identification information and the detected signal strength information to the indoor location measurement system 100 using the wireless signal transmitter according to the embodiment of the present invention. The indoor location measurement system 100 using the wireless signal transmitter may measure the location of the user terminal 200 in the space using the identification information and the signal strength information. At this time, as described below, the indoor location measurement system 100 using the wireless signal transmitter may store location information of the locations of the plurality of wireless signal transmitters 10, 11, 12, and 13. Since a method or an algorithm of receiving the plurality of wireless signals and measuring the location are a well-known technology such as a triangulation method, a detailed description thereof will be omitted in this specification.

Figure 4:
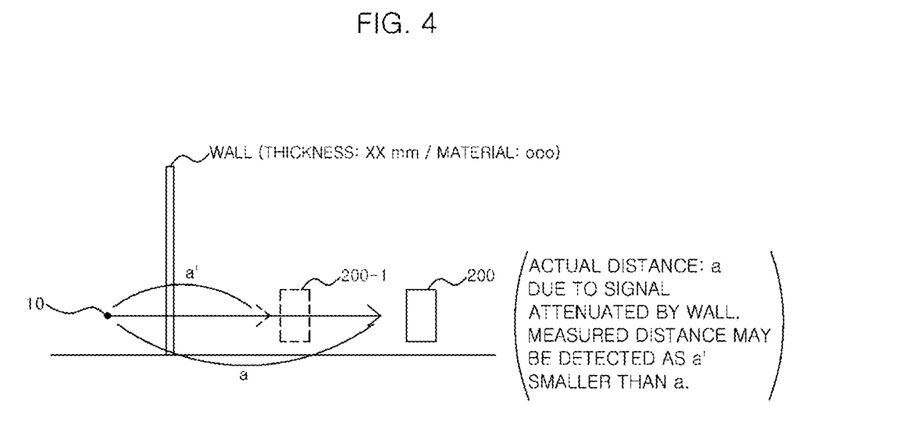
FIG. 4 illustrates an example of a method of correcting signal strength information of an wireless signal in the indoor location measurement system using the wireless signal transmitter according to the embodiment of the present invention.

However, as illustrated in the drawings, there may be many cases where the wireless signal passes through various objects, such as walls or windows, rather than directly arriving at the user terminal 200. In general, a distance between the user terminal 200 and the wireless signal transmitter outputting the wireless signal may be calculated from the signal strength information of the corresponding wireless signal. However, as illustrated in FIG. 4 to be described below, the signal strength of the wireless signal may be distorted while passing through the objects. Thus, an error may occur between the actual location of the user terminal 200 and the measured location.

Therefore, the indoor location measurement system 100 using the wireless signal transmitter according to the embodiment of the present invention may prestore spatial information of the space and location information of the plurality of wireless signal transmitters 10, 11, 12, and 13 and may be implemented to correct the signal strength information of the wireless signal using the spatial information and the location information.

At this time, the spatial information may be implemented in the form of, for example, Building Information Modeling (BIM) information, but is not limited thereto. The spatial information may be information that is modeled to express the objects, for example, floors, walls, and the like, or express the locations of the objects that may be included in the path of an wireless signal even if information on all objects included in an internal space of a building (for example, facilities such as electric wirings or water pipes, inner objects such as desks or chairs, and the like) is not all expressed.

Information on characteristics of the objects may be further included in the spatial information. The characteristics of the objects may mean information on characteristics of the objects, such as thicknesses, materials, or the like of the objects, which may influence the signal strength of the wireless signal when the wireless signal passes through the objects. For example, in the case of an wireless signal passing through one wall, the attenuation degree of the wireless signal may be changed according to the thickness or the material of the wall, for example, according to whether the material of the wall is concrete, wood, or glass. Thus, a more accurate location of the user terminal 200 may be measured by correcting the signal strength information of the wireless signal received by the user terminal 200 using the spatial information, the characteristics of the objects, and a variation in the signal strength of the wireless signal passing through the objects according to the characteristics of the objects.

For example, as illustrated in FIG. 2, in the case where the user terminal 200 receives wireless signals (for example, a first wireless signal, a second wireless signal, and/or a third wireless signal) from the first wireless signal transmitter 10, the second wireless signal transmitter 11, and the third wireless signal transmitter 12, the user terminal 200 may transmit, to the indoor location measurement system 100 using the wireless signal transmitter, measurement information including the identification information of the wireless signal transmitters and the signal strength information of the wireless signals (for example, the first wireless signal, the second wireless signal, and/or the third wireless signal).

The indoor location measurement system 100 using the wireless signal transmitter may calculate the location of the user terminal 200 based on the received measurement information.

To this end, the indoor location measurement system 100 using the wireless signal transmitter may correct the signal strength or the distance between the user terminal 200 and each of the wireless signal transmitters.

That is, it can be seen that the wireless signal (for example, the first RF signal) output from the first wireless signal transmitter 10 may pass through a wall 1 and arrive at the user terminal 200, and the wireless signal (for example, the second wireless signal) output from the second wireless signal transmitter 20 may pass through a wall 2 and arrive at the user terminal 200. In addition, the wireless signal (for example, the third wireless signal) output from the third wireless signal transmitter 12 may be positioned in the same sub-space as the user terminal 200 and directly arrive at the user terminal 200 without passing through any object.

At this time, the indoor location measurement system 100 using the wireless signal transmitter may correct the signal strength information, which is included in the first received measurement information, according to the characteristics of the wall 1, that is, the material (for example, concrete, plaster, wood, or the like) and the thickness of the wall 1, and calculate the distance between the first wireless signal transmitter 10 and the user terminal 200, based on the corrected signal strength information. Similarly, the signal strength information of the wireless signal passing through the wall 2 may be corrected according to the characteristics of the wall 2 and the distance between the second wireless signal transmitter 11 and the user terminal 200 may be calculated using the corrected signal strength information. In the case of the third wireless signal transmitter 12, no correction may be performed because no objects are positioned between the third wireless signal transmitter 12 and the user terminal 200, based on the prestored spatial information.

As such, if the signal strength information on the wireless signals received by the user terminal 200 is corrected according to the characteristics of the objects, it is possible to measure a relatively accurate location of the user terminal 200 in the space using the corrected signal strength information.

Meanwhile, the location of the user terminal 200 needs to be first determined so as to determine whether a some object is positioned between the wireless signal transmitters 10, 11, and 12 and the user terminal 200. To this end, according to an embodiment of the present invention, the location of the user terminal 200 may be roughly grasped (or determined) based on the signal strength information of the wireless signals included in the measurement information that is received from the user terminal 200, and the objects existing between the wireless signal transmitters 10, 11, and 12 and the user terminal 200 may be determined using the roughly grasped location of the user terminal 200. However, in this case, there is a problem in that the presence or absence of the objects is determined based on the inaccurate location of the user terminal 200.

Therefore, according to another embodiment of the present invention, there may be provided an inventive concept that estimates candidate locations of the user terminal 200, based on the wireless signal transmitters 10, 11, and 12, and measures the location of the user terminal 200 using the estimated candidate locations. A method of estimating candidate location of the user terminal 200 in the indoor location measurement system 100 using the RF signal transmitter will be described with reference to FIG. 5.

Figure 5:
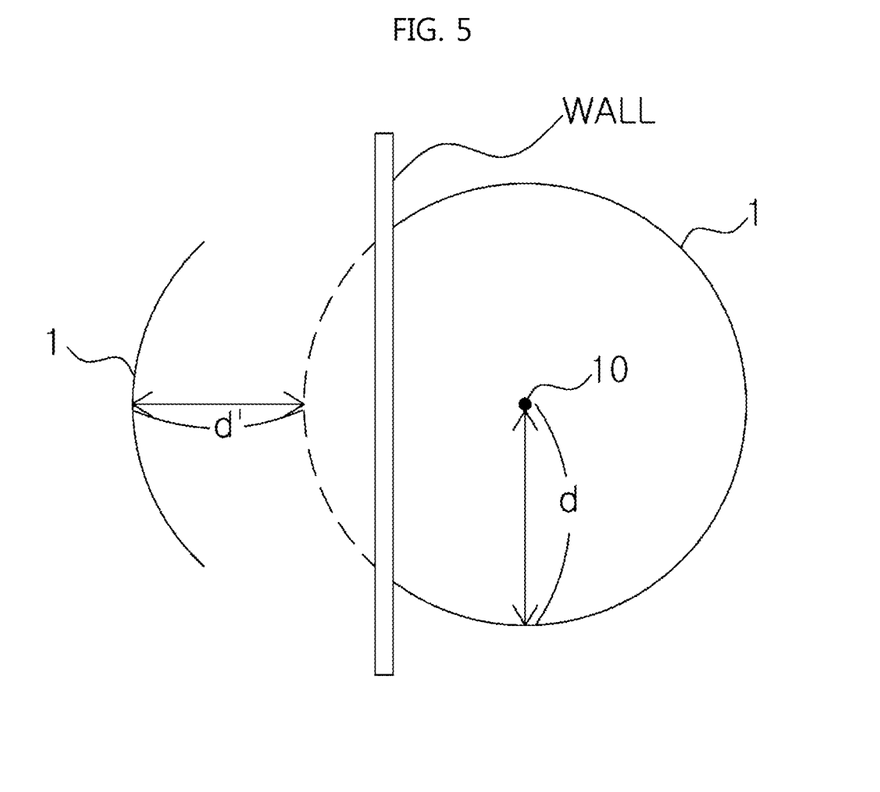
FIG. 5 illustrates an example of a method of measuring a location of a user terminal in the indoor location measurement system using the wireless signal transmitter according to the embodiment of the present invention.

FIG. 5 illustrates an example of a method of measuring a location of a user terminal in the indoor location measurement system using the wireless signal transmitter according to the embodiment of the present invention.

Referring to FIG. 5, the location of the user terminal 200 receiving an wireless signal (for example, the first wireless signal) output from a specific wireless signal transmitter (for example, the first RF signal transmitter 10) among the plurality of wireless signal transmitters 10, 11, 12, and 13 may be in a range having a predetermined radius (for example, d) with the first wireless signal transmitter 10 as the center. The predetermined radius d may be determined based on the signal strength information of the first wireless signal received by the user terminal 200.

At this time, in a case where an object (for example, a wall) does not exist between the first wireless signal transmitter 10 and the user terminal 200 receiving the first wireless signal, it may be estimated that the user terminal 200 receiving the first wireless signal is positioned on a circumference of a circle having the radius d. In this case, the distance between the first wireless signal transmitter 10 and the user terminal 200 may be calculated based on the signal strength of the first wireless signal received by the user terminal 200 as described above. Accordingly, the indoor location measurement system 100 using the wireless signal transmitter may estimate a possible location of the user terminal 200, that is, the circumference of the circle having the radius d with the first wireless signal transmitter 10 as the center, as a candidate location 1 of the user terminal 200.

As illustrated above, in a case where a predetermined object (for example, a wall) exists in the path of the first wireless signal (that is, within the radius d), the signal strength of the first wireless signal may be distorted when the first wireless signal passes through the object (for example, the wall). In this case, in a case where the user terminal 200 is positioned on the opposite side (left side of the drawing) of the object (for example, the wall), a difference from an actual location inevitably occurs even when an wireless signal having the same signal strength as the right side of the object (for example, the wall) is received.

Therefore, as described above, the indoor location measurement system 100 using the wireless signal transmitter may estimate the candidate location 1 (indicated by a solid line) of the user terminal 200 by correcting the signal strength of the first wireless signal in a portion (indicated by a dashed line) where the first wireless signal passes through the object (for example, the wall) using the prestored spatial information of the space and the location information of the wireless signal transmitters. That is, in a case where the signal strength is not corrected, the circumference of the circle having the radius d with the first wireless signal transmitter 10 as the center may be estimated as the candidate location. However, according to an embodiment of the present invention, in the portion where the first wireless signal passes through the object (for example, the wall), a location spaced apart from the first wireless signal transmitter 10 by a distance of d+d' may be estimated as the candidate location.

The indoor location measurement system 100 using the wireless signal transmitter may estimate, as the candidate location, all or part of locations estimable as the location of the user terminal 200 (that is, locations where the user terminal 200 can receive the first wireless signal of the corresponding signal strength) according to the radius based on the signal strength of the first wireless signal.

For example, the indoor location measurement system 100 using the wireless signal transmitter may determine locations except for the location where the user cannot be positioned in the space among the candidate locations, based on the prestored spatial information, and estimate the determined locations as first candidate locations corresponding to the first wireless signal transmitter 10.

As a result, as illustrated in FIG. 5, in a case where the signal strength of the wireless signal (for example, the first RF signal) received from the first wireless signal transmitter 10 is signal strength corresponding to the distance d, the indoor location measurement system 100 using the wireless signal transmitter may determine the object existing at the location within the distance d from the first wireless signal transmitter 10. Then, the candidate location may be determined using the corrected signal strength that is corrected using correction data according to the determined object.

As described above, the method of estimating the candidate location of the user terminal 200 in the indoor location measurement system 100 using the wireless signal transmitter may be equally applied to each of the wireless signals when the user terminal 200 receives the plurality of wireless signals from the plurality of wireless signal transmitters.

For example, as described above, in a case where the user terminal 200 receives the first wireless signal output from the first wireless signal transmitter 10, the second wireless signal output from the second wireless signal transmitter 11, and the third wireless signal output from the third wireless signal transmitter 12 and transmits the measurement information including the signal strength information and the identification information thereof, the indoor location measurement system 100 using the wireless signal transmitter may correct the signal strengths of the respective wireless signals at the locations where the wireless signals from the wireless signal transmitters (for example, the first wireless signal transmitter 10, the second wireless signal transmitter 11, and/or the third wireless signal transmitter 12) can be received, and estimate the corresponding candidate locations for each wireless signal (each RF signal transmitter) using the corrected signal strength information.

The indoor location measurement system 100 using the wireless signal transmitter may specify the candidate location, which is commonly overlapped among the estimated candidate locations, as a common location and measure the specified common location as a current location of the user terminal 200. At this time, as described above, a plurality of candidate locations may be estimated for each wireless signal, or the candidate location may be estimated as a predetermined range.

In order to correct the signal strength information of the RF signal passing through the object, the indoor location measurement system 100 using the wireless signal transmitter may pre-store predetermined correction data indicating the variation in the signal strength of the wireless signal according to the characteristics of the object. The correction data will be described below.

Hereinafter, the configuration, operation, and effects of the indoor location measurement system 100 using the wireless signal transmitter according to the embodiment of the present invention will be described with reference to FIG. 3 and FIG. 4.

Figure 3:
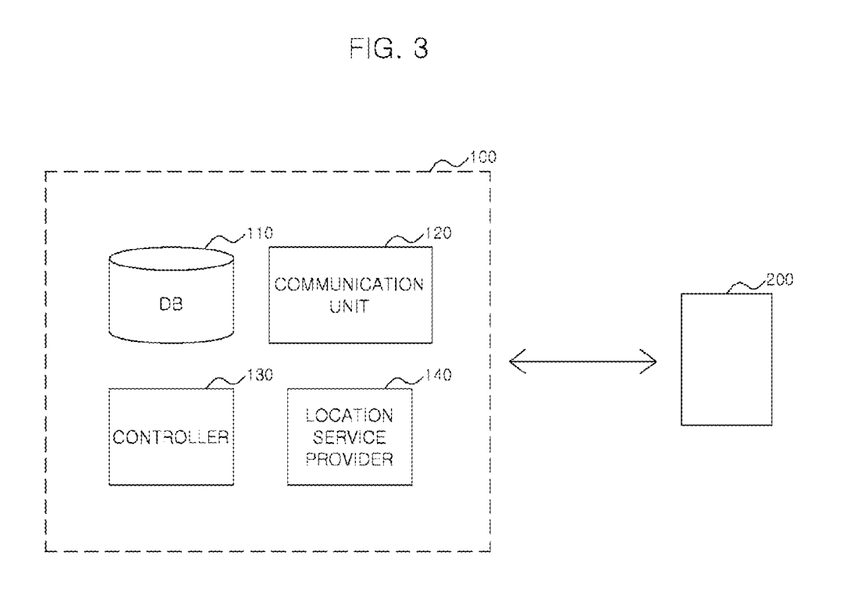
FIG. 3 illustrates a schematic configuration of the indoor location measurement system using the wireless signal transmitter according to the embodiment of the present invention.

FIG. 3 illustrates a schematic configuration of the indoor location measurement system according to the embodiment of the present invention, and FIG. 4 illustrates an example of a method of correcting signal strength information of an wireless signal in the indoor location measurement system according to the embodiment of the present invention.

First, referring to FIG. 3, the indoor location measurement system 100 using the wireless signal transmitter according to the embodiment of the present invention includes a database (DB) 110, a communication unit 120, and a controller 130. According to some implementations, the indoor location measurement system 100 using the wireless signal transmitter may further include a location service provider 140. In addition, the indoor location measurement system 100 using the wireless signal transmitter may transmit and receive data necessary for realizing the inventive concept of the present invention while communicating with the user terminal 200.

The indoor location measurement system 100 using the wireless signal transmitter may include hardware resources and/or software necessary for realizing the inventive concept of the present invention and may not necessarily mean a single physical element or a single apparatus. That is, the indoor location measurement system 100 using the wireless signal transmitter may mean the logical combination of hardware and/or software included for realizing the inventive concept of the present invention and, if necessary, may be configured by a set of logical elements installed in separate apparatuses to realize the inventive concept of the present invention by performing their functions.

The indoor location measurement system 100 using the wireless signal transmitter according to the embodiment of the present invention may be implemented as a predetermined server. In a case where the indoor location measurement system 100 using the wireless signal transmitter is implemented as a server, the indoor location measurement system 100 using the wireless signal transmitter may realize the inventive concept by transmitting and receiving predetermined data while communicating with the user terminal 200 via a network.

In addition, the DB in this specification may mean a functional structural combination of software and hardware storing relevant information in DBs. The DB may be implemented as at least one table and may further include a separate database management system (DBMS) for searching, storing, and managing the information stored in the DB. In addition, the DB may be implemented in various forms, such as a linked-list, a tree, or a relational DB and includes any data storage medium and data structure able to store relevant information in the DB.

Furthermore, the user terminal 200 may be implemented as a mobile terminal such as a smartphone or a tablet PC. In addition, the user terminal 200 may include any type of data processing devices, such as a notebook computer, that can receive an RF signal while being held by the user, and can realize the inventive concept by being connected to a network.

As described above, the DB 110 may store spatial information on the predetermined space (for example, a building or the like) and the location information of the plurality of wireless signal transmitters installed in the space. In addition, the DB 110 may further store the characteristics of the objects positioned in the space, and the correction data for the characteristics of the objects, based on the variation in the signal strength when the wireless signal passes through the object. As described above, the characteristics of the objects may mean the information on the materials and/or thicknesses of the objects. The characteristics of the objects may be included in the spatial information. According to some implementations, the characteristics of the objects may be stored as information separate from the spatial information.

In addition, as described above, the correction data may mean data associated with various parameters necessary for correcting a variation occurring when an wireless signal of a specific frequency passes through an object having a specific material and thickness. For example, the DB 110 may store at least one table in which correction data is aligned, the correction data indicating a variation of the wireless signal passing through the object according to the material and thickness of the object, for example, when the material of the object is concrete, cement, or wood.

The correction data may be data recorded after measuring the variation in the signal strength of the wireless signal passing through the objects according to the materials of the objects by experiments. In addition, regarding the object of the specific material, the correction data may include subdivided data in which the variation in the signal strength of the wireless signal is recorded according to the thickness thereof. That is, according to the exemplary embodiment, the correction data may mean any type of data provided for correcting the signal strength of the wireless signal, based on data actually measured through various experiments. In addition, regarding the object of the specific material, if an amount of the actually measured data increases, the variation in the signal strength may be calculated based on the actually measured data, even when the thickness of the object of the corresponding material is changed.

The communication unit 120 may receive the measurement information including the identification information and the signal strength information of the wireless signal from the user terminal 200 receiving the wireless signal that includes the identification information of the wireless signal transmitter and is output by the wireless signal transmitter. As described above, it is obvious that the measurement information may include identification information and signal strength information of the plurality of wireless signals received by the user terminal 200, as well as identification information and signal strength information of one wireless signal.

When the measurement information is received by the communication unit 120, the controller 130 may correct the signal strength information included in the measurement information, based on the spatial information and the location information stored in the DB 110, and measure the current location of the user terminal 200 using the corrected signal strength information.

At this time, the controller 130 may determine the object positioned in the path through which the wireless signal is received by the user terminal 200 using the spatial information stored in the DB 110, and correct the signal strength information included in the measurement information using the correction data corresponding to the characteristics of the determined object. As described above with reference to FIG. 5, the process of determining the presence or absence of the object is performed according to whether the object is present in a predetermined range with a distance between the wireless signal transmitter and the user terminal 200 as the radius, based on the signal strength information included in the measurement information.

When it is determined through the above process that the object is present between the wireless signal transmitter and the user terminal 200, it is necessary to correct the signal strength information included in the measurement information.

Referring to FIG. 4, the user terminal 200 positioned in a predetermined space may receive an wireless signal output from a specific wireless signal transmitter (for example, the first RF signal transmitter 10). At this time, an actual distance between the first wireless signal transmitter 10 and the user terminal 200 may be "a." However, as illustrated, in a case where the object, for example, the wall, is present between the first wireless signal transmitter 10 and the user terminal 200, the signal strength of the wireless signal output from the first wireless signal transmitter 10 may be weakened while the first wireless signal is passing through the wall. In a case where the wall is not present, the distance to be calculated by the controller 130 has to be the actual distance a or adjacent to the actual distance a. However, due to the wall, the distance to be calculated by the controller 130 may be a distance a' closer than the actual distance a. In this case, as illustrated, there is a problem in that the resultant measured location of the user terminal 200 in the space may be measured as a location 200-1 different from the actual location. Therefore, as described above, the DB 110 may prestore the location of the first wireless signal transmitter 10, the spatial information of the space, the characteristics of the wall (for example, the thickness and material of the wall), and the corresponding correction data. When it is determined that the user terminal 200 receives the wireless signal passing through the wall, the controller 130 may correct the signal strength information of the RF signal received from the first wireless signal transmitter 10 by the user terminal 200, based on the prestored correction data and thus acquire the corrected signal strength information for measuring a more accurate location of the user terminal 200.

As described above with reference to FIG. 5, the controller 130 may estimate the candidate location of the user terminal 200 using the corrected signal strength information acquired through the above-described process. At this time, in a case where the user terminal 200 receives a plurality of wireless signals, it is possible to measure a relatively accurate location of the user terminal 200 in the space by estimating candidate locations of the plurality of wireless signals and measuring a common location commonly overlapped among the estimated candidate locations as a current location of the user terminal 200.

Meanwhile, as described above, the wireless signal transmitter, such as the beacon, usually uses a built-in battery as a power supply. In this case, it is inconvenient for a manager to check and manage a battery level periodically (or regularly). There may be a risk that the location information cannot be received due to the discharge of the battery when the user needs to receive the location information.

Therefore, according to the embodiment of the present invention, the plurality of wireless signal transmitters may be installed in emergency light and/or evacuation guidance light provided in the internal space of the building or the like and share the power supply with the emergency light and/or the evacuation guidance light. In the case of the emergency light and/or the evacuation guidance light, the emergency light and/or the evacuation guidance light need to be continuously turned on for easy evacuation of persons even in the event of power failure or various emergency situations accompanied by the power failure. Thus, the emergency light and/or the evacuation guidance light use the power supply separate from a power supply usually used in the space in the building or the like. Therefore, in a case where the emergency light and/or the evacuation guidance light are configured to share the power supply with the plurality of wireless signal transmitters, the location of the user (the location of the user terminal 200) can be accurately measured even in the event of the emergency situations. In addition, it is possible to significantly reduce the inconvenience that the manager has to manage the batteries of the RF signal transmitters one by one.

As such, in a case where the location of the user (the location of the user terminal 200) can be accurately measured, a service such as an indoor navigation can be provided to the user. Therefore, the user can reach a desired destination easily in a complicated space at ordinary time and can also easily provide an evacuation route in the emergency situations such as power failure in which a general lighting is not turned on. Alternatively, in a case where a user is isolated in the space, the user who is in urgent need of rescue can be rapidly found through the accurately measured location of the user terminal 200.

To this end, the indoor location measurement system 100 using the wireless signal transmitter may further include the location service provider 140 as described above.

As described above, the location service provider 140 may transmit the current location of the user terminal 200, which is measured by the controller 130, to the user terminal 200 through the communication unit 120. The user terminal 200, which receives the current location from the location service provider 140, may easily provide the location information to the user by displaying map information of the space where the current location is indicated.

According to some implementations, the location service provider 140 may transmit the current location of the user terminal 200 to a predetermined external system (not illustrated). The external system (not illustrated) may mean a series of systems that needs to grasp the location of the user. Examples of the external system (not illustrated) may include a management system or a fire protection system which manages the space.

In addition, the location service provider 140 may be configured to allow the user terminal 200 to provide an indoor navigation service by continuously transmitting the current location of the user terminal 200, which is grasped by the controller 130, to the user terminal 200 in real time.

Figure 6:
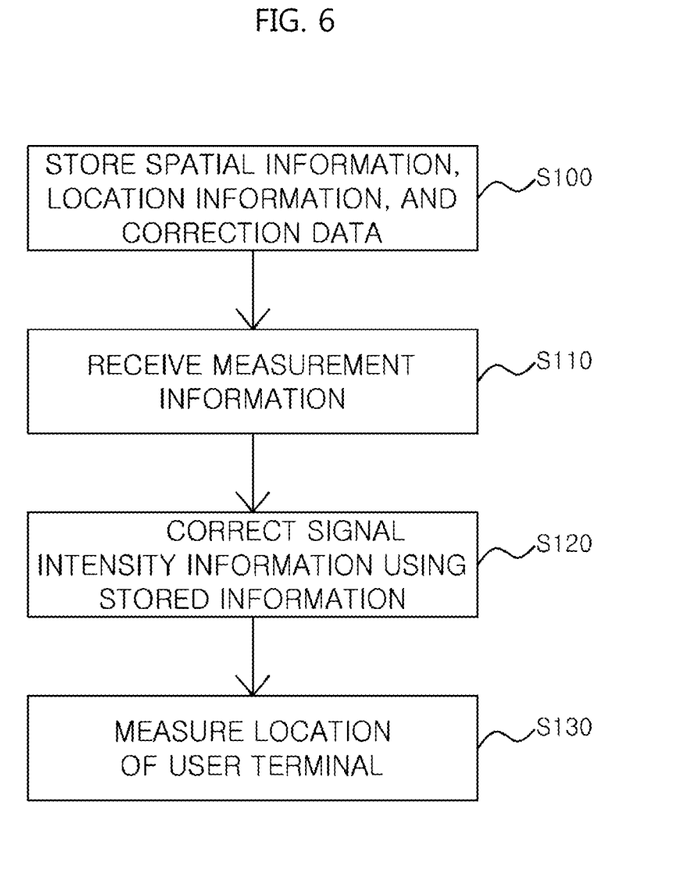
FIG. 6 illustrates a schematic flow of an indoor location measurement method using an RF signal transmitter according to an embodiment of the present invention.

FIG. 6 illustrates a schematic flow of an indoor location measurement method using a wireless signal transmitter according to an embodiment of the present invention.

Referring to FIG. 6, the indoor location measurement system 100 using the wireless signal transmitter according to the embodiment of the present invention may store spatial information of a predetermined space and location information of wireless signal transmitters in the DB 110 (S100). As described above, the spatial information may store the characteristics of various objects positioned in the space and may further include the correction data for the characteristics of the objects, based on the variation in the signal strength when the wireless signal passes through the objects positioned in the space.

The indoor location measurement system 100 using the wireless signal transmitter may receive measurement information from the user terminal 200 that receives the wireless signal output from the wireless signal transmitter (S110). As described above, the measurement information may include identification information and signal strength information of the wireless signals received by the user terminal 200.

The indoor location measurement system 100 using the wireless signal transmitter may correct the signal strength information included in the measurement information using the spatial information, the location information, the characteristics of the objects, and the correction data for the characteristics, which are prestored in the DB 110 (S120), and may estimate candidate locations of the wireless signals received by the user terminal 200 in the space using the corrected signal strength information and measure the common location commonly overlapped among the estimated candidate locations as the current location of the user terminal 200 (S130).

The indoor location measurement system and method using a radio signal transmitter according to embodiments of the present invention may be embodied as computer readable codes stored in a computer readable recording medium. The computer readable recording medium includes all sorts of record devices in which data readable by a computer system are stored. Examples of the computer readable recording medium include read only memory (ROM), random access memory (RAM), compact disc read only memory (CD-ROM), a magnetic tape, a hard disk, a floppy disk, an optical data storage device and the like. Further, the recording medium may be implemented in the form of a carrier wave (e.g. Internet transmission). In addition, the computer readable recording medium may be distributed to computer systems on the network, in which the computer readable codes are stored and executed in a decentralized fashion. In addition, functional programs, codes and code segments for embodying the present invention can be easily construed by programmers having ordinary skill in the art to which the present invention pertains.

While the present invention has been described with reference to the certain exemplary embodiments shown in the drawings, it will be understood by a person skilled in the art that various modifications and equivalent other embodiments may be made therefrom. Therefore, the true scope of the present invention shall be defined by the concept of the appended claims.

What is claimed is:

1. A method of providing wireless signal intensity data, the method comprising:
providing 3D model data of a building that has a plurality of interior structures and objects, wherein the 3D model data comprise a location and a material for at least part of the plurality of interior structures and objects;
generating first signal intensity data representing a first spatial map of wireless signal intensity for a first wireless transmitter installed or to be installed inside the building using the 3D model data, a first location of the first wireless transmitter and a first signal strength of the first wireless transmitter, wherein at a first three-dimensional location wireless signal intensity from the first wireless transmitter is computed in consideration of attenuation of wireless signal intensity depending on spatial occupancy and a material of at least one structure or object located between the first wireless transmitter and the first three-dimensional location, wherein equiintensity lines of the first spatial map are not concentric and comprise at least one discontinuous point due to spatial occupancy of at least part of the plurality of interior structures and objects;
generating second signal intensity data representing second spatial map of wireless signal intensity for a second wireless transmitter installed or to be installed inside the building using the 3D model data, a second location of the second wireless transmitter and a second signal strength of the second wireless transmitter, wherein at a second three-dimensional location wireless signal intensity from the second wireless transmitter is computed in consideration of attenuation of wireless signal intensity depending on spatial occupancy and a material of at least one structure or object located between the second wireless transmitter and the second three-dimensional location, wherein equiintensity lines of the second spatial map are not concentric and comprise at least one discontinuous point due to spatial occupancy of at least part of the plurality of interior structures and objects;

generating third signal intensity data representing a third spatial map of wireless signal intensity for of a third wireless transmitter installed or to be installed inside the building using the 3D model data, a third location of the third wireless transmitter and a third strength of the third wireless transmitter, wherein at a third three-dimensional location wireless signal intensity from the third wireless transmitter is computed in consideration of attenuation of wireless signal intensity depending on spatial occupancy and a material of at least one structure or object located between the third wireless transmitter and the third three-dimensional location, wherein equiintensity lines of the third spatial map are not concentric and comprise at least one discontinuous point due to spatial occupancy of at least part of the plurality of interior structures and objects.

2. The method of claim 1, wherein the spatial occupancy represents location, shape, size of an, interior structure or object.

3. The method of claim 1, further comprising:
receiving, from a mobile terminal, a first intensity of the first wireless transmitter's signal at a fourth location inside the building, a second intensity of the second wireless transmitter's signal at the fourth location, and a third intensity of the third wireless transmitter's signal at the fourth location;
determining coordinates of the fourth location using the first, second and third intensity received from the mobile terminal and further using the first, second and third signal intensity data; and
sending the coordinates of the fourth location to the mobile terminal.

\* \* \* \* \*